(12) United States Patent
Xu et al.

(10) Patent No.: US 11,808,089 B2
(45) Date of Patent: Nov. 7, 2023

(54) COATINGS TO PREVENT CUTTER LOSS IN STEEL BODY PDC DOWNHOLE TOOLS

(71) Applicant: SAUDI ARABIAN OIL COMPANY, Dhahran (SA)

(72) Inventors: Jianhui Xu, Dhahran (SA); Guodong (David) Zhan, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 446 days.

(21) Appl. No.: 16/999,429

(22) Filed: Aug. 21, 2020

(65) Prior Publication Data
US 2022/0056766 A1  Feb. 24, 2022

(51) Int. Cl.
| | |
|---|---|
| *E21B 10/42* | (2006.01) |
| *E21B 10/46* | (2006.01) |
| *E21B 10/567* | (2006.01) |
| *E21B 10/55* | (2006.01) |
| *E21B 10/573* | (2006.01) |
| *B23K 1/00* | (2006.01) |

(Continued)

(52) U.S. Cl.
CPC ........ *E21B 10/5735* (2013.01); *B23K 1/0008* (2013.01); *B23K 1/20* (2013.01); *C23C 30/005* (2013.01); *B23K 2101/002* (2018.08); *E21B 10/55* (2013.01)

(58) Field of Classification Search
CPC ........ E21B 10/42; E21B 10/46; E21B 10/567; E21B 10/55
See application file for complete search history.

(56) References Cited

U.S. PATENT DOCUMENTS

| | | |
|---|---|---|
| 6,772,849 B2 | 8/2004 | Oldham et al. |
| 7,770,672 B2 | 8/2010 | Kembaiyan et al. |

(Continued)

FOREIGN PATENT DOCUMENTS

EP   1944461 A2   7/2008

OTHER PUBLICATIONS

Kembaiyan, K.T. and Kesh Keshavan, "Combating severe fluid erosion and corrosion of drill bits using thermal spray coatings", Wear, Elsevier Science S.A., 1995, pp. 487-492 (6 pages).

(Continued)

*Primary Examiner* — Cathleen R Hutchins
(74) *Attorney, Agent, or Firm* — Osha Bergman Watanabe & Burton LLP

(57) ABSTRACT

Methods of preventing or reducing cutter loss in a steel body PDC drilling tool may include applying a hardfacing layer on a surface of a PDC cutter pocket to form a covered PDC cutter pocket, the hardfacing layer comprising a metal binder and coated tungsten carbide particles; and bonding a PDC cutter into the covered PDC cutter pocket with a brazing material. Steel body PDC drilling tools may include a steel body, a PDC cutter, a PDC cutter pocket, and a hardfacing layer. Methods of preventing or reducing cutter loss in a steel body PDC drilling tool may include applying a hardfacing layer on a surface of a PDC cutter pocket of the steel body PDC drilling tool; applying a coated buffering layer on the hardfacing layer to form a coated PDC cutter pocket; and bonding the PDC cutter into the coated PDC cutter pocket with a brazing material.

13 Claims, 7 Drawing Sheets

(51) Int. Cl.
*B23K 1/20* (2006.01)
*C23C 30/00* (2006.01)
*B23K 101/00* (2006.01)

(56) References Cited

U.S. PATENT DOCUMENTS

| | | | |
|---|---|---|---|
| 8,056,652 B2 | 11/2011 | Lockwood et al. | |
| 8,342,268 B2 * | 1/2013 | Lockstedt | B22F 3/26 |
| | | | 175/374 |
| 8,757,472 B2 * | 6/2014 | Egan | C04B 37/026 |
| | | | 228/206 |
| 2004/0245024 A1 * | 12/2004 | Kembaiyan | E21B 10/00 |
| | | | 175/425 |
| 2005/0109545 A1 | 5/2005 | Lockwood et al. | |
| 2012/0067651 A1 | 3/2012 | Xia et al. | |
| 2014/0174834 A1 * | 6/2014 | Zhang | E21B 10/36 |
| | | | 175/432 |

OTHER PUBLICATIONS

Sue, Albert et al., "Improved Hardfacing for Drill Bits and Drilling Tools", Journal of Thermal Spray Technology, ASM International, vol. 20(1-2), Jan. 2011, pp. 372-377 (6 pages).

* cited by examiner

COATINGS TO PREVENT CUTTER LOSS IN STEEL BODY PDC DOWNHOLE TOOLS

BACKGROUND

Modern oil and gas drilling operations may take place in various formations. These operations are performed to locate and gather valuable downhole hydrocarbons. In particular, oil rigs may be placed at wellsites and downhole tools, such as drilling tools, may be used in the ground to reach subsurface reservoirs. These drilling tools may include bits for drilling oil wells. These bits may have steel bodies that are connected at the bottom of drill strings. These drill bits may be cutter drill bits with polycrystalline diamond compact (PDC) cutting elements.

PDC bits have been gaining more market share in the drill bits family as the materials, design and implementation have improved. More particularly, steel body PDC bits have been widely used in drilling less aggressive formations, such as shale, siltstone, mudstone, claystone, etc. The steel body provides higher impact and torque resistances than their counterpart matrix body and, therefore, the designs of the bit bodies and blades may be much more aggressive than those of the matrix body PDC bits. However, the steel body PDC cutters may endure higher impact, vibration and bending. Thus, they are more prone to get lost from the cutter pockets into downhole during drilling. These lost cutters at the bottom of the well can cause severe damage to the drill bits and bottom hole assembly in the further drilling and should be cleaned out of the wellbore. This clean-up process and replacement of the drill bit can generate a lot of non-production time and additional costs to the drilling operation. A number of steel body PDC drilling tools including polycrystalline diamond compact (PDC) bits, reamers, hole openers, milling tools, or stabilizers may also lose cutters.

A hardfacing material is generally placed on the blades of steel body PDC bits to provide the erosion and abrasion resistance to the steel body. Further, the hardfacing on critical areas such as those around the PDC cutters results in the integrity of the substrate materials in these locations and protects the PDC cutters from loss out of the pockets. The hardfacing material is typically comprised of tungsten carbide particles and metal binders. It is typically processed on the steel body by OAW (oxyacetylene welding), GMAW (gas metal arc welding), FCAW (flux cored arc welding), PAW (plasma arc welding), LW (laser welding), GTAW (gas tungsten arc welding), SAW (submerged arc welding), EBW (electron beam welding), thermal spraying, spray and fuse, or pre-processing by additive manufacturing or other manufacturing process, etc. before brazing of the PDC cutters.

A brazing material is generally used to bond the PDC cutters to the bit body through the brazing process. Part of this bonding happens between the tungsten carbide particles in a hardfacing layer surrounding the PDC cutter pockets and the brazing material. This brazing material has poor contact with the tungsten carbide particles which are the main materials in the hardfacing layer. This results in poor erosion and abrasion resistance of the bit body around the PDC cutters. Additionally, the delamination at the poor contact area may also result in the disconnection of the PDC cutter from the cutter pocket of the bit during drilling, resulting in PDC cutter losses.

SUMMARY OF INVENTION

In one aspect, embodiments disclosed herein are directed to methods of preventing or reducing cutter loss in a steel body polycrystalline diamond compact (PDC) drilling tool. The methods may include applying a hardfacing layer on a surface of a PDC cutter pocket to form a covered PDC cutter pocket, the hardfacing layer comprising a metal binder and coated tungsten carbide particles. The methods may also include bonding a PDC cutter into the covered PDC cutter pocket with a brazing material. In the methods disclosed herein the coated tungsten carbide particles may include tungsten carbide particles and a coating comprising tungsten metal, titanium metal, a tungsten alloy, a titanium alloy, or mixtures thereof.

In another aspect, embodiments disclosed herein are directed to steel body PDC drilling tools. The steel body PDC drilling tools may include a steel body, a PDC cutter, a PDC cutter pocket, and a hardfacing layer. In these drilling tools, the hardfacing layer may include coated tungsten carbide particles and a metal binder. Further, the coated carbide particles may include tungsten carbide particles and a coating comprising tungsten metal, titanium metal, a tungsten alloy, a titanium alloy, or mixtures thereof.

In another aspect, embodiments disclosed herein are directed to methods of preventing or reducing cutter loss in a steel body PDC drilling tool. The methods may include applying a hardfacing layer on a surface of a PDC cutter pocket of the steel body PDC drilling tool. The methods may also include applying a coated buffering layer on the hardfacing layer to form a coated PDC cutter pocket. The methods may further include bonding the PDC cutter into the coated PDC cutter pocket with a brazing material. In the methods disclosed herein, the coated buffering layer may include tungsten metal, titanium metal, nickel metal, cobalt metal, chromium metal, iron metal, a tungsten alloy, a titanium alloy, a nickel alloy, a cobalt alloy, a chromium alloy, an iron alloy, or mixtures thereof.

Other aspects and advantages of the invention will be apparent from the following description, drawings, and appended claims.

DETAILED DESCRIPTION

Inside a cutter pocket of a steel body PDC drilling tool, such as a PDC bit, the contact between the brazing material and the tungsten carbide particles of the hardfacing layer may be about 10-20% of the whole area of the cutter pocket. In order to maximize the contact between the brazing material and the tungsten carbide particles of the hardfacing layer, a coating may be applied on the tungsten carbide particles prior to the hardfacing process to steel body PDC drilling tools. These coated tungsten carbide particles present in the hardfacing layer can provide better wetting capability with the brazing materials used to bond the PDC cutters to the PDC cutter pockets in steel body PDC drilling tools. Thus, the retention of PDC cutters in the cutter pockets can be improved during aggressive drilling process.

Additionally, a coating applied on the steel body of a PDC drilling tool, in particular around and on the surface of PDC cutter pockets, after the hardfacing process, can also improve the retention of PDC cutters in the cutter pockets during aggressive drilling process.

With coated carbide particles applied before the hardfacing or coated steel body after the hardfacing, steel body PDC drilling tools can lessen cutter loss at the bottom of the well. When these drilling tools are used to drill less aggressive formations, such as shale, siltstone, mudstone, claystone, etc., they can maintain their integrity longer than drilling tools without carbide particles applied before the hardfacing or bits coated after the hardfacing.

Figure 1:
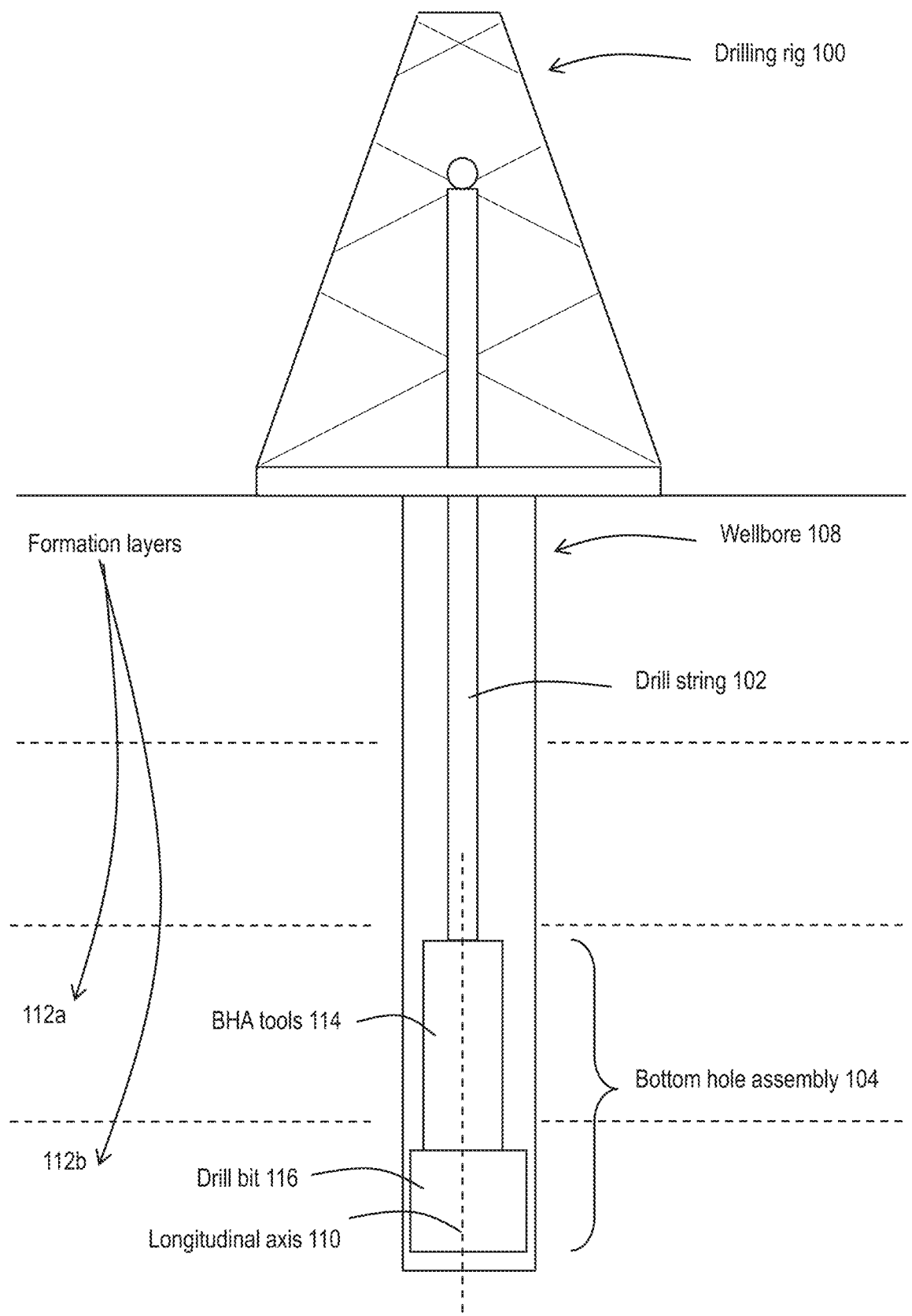
FIG. 1 is a schematic representation of a wellbore drilling system.

Referring to FIG. 1, an example drilling rig 100 is shown. The drilling rig 100 includes a drill string 102 connected along longitudinal axis 110 to a bottom hole assembly 104 which includes a drill bit 116. In addition to the drill bit 116, the bottom hole assembly may include several other components such as a bit sub, stabilizer, drill collar, jarring device, mud motor, logging-while-drilling equipment, measurements-while-drilling equipment, and other tools represented by box 114, depending on the planned profile of the wellbore and the type of formation the bit will carve through.

As the drill bit 116 encounters various formations, such as 112*a* and 112*b*, in the wellbore 108, it may be changed according to the type of formation. There are several types of drill bits, each designed for a specific drilling environment. For example, roller-cone bits crush and chip away chunks of formation, hammer bits act to impact and break formation, and drag bits, such as PDC bits, scrape and shear formations.

The high pressure, high temperature environment encountered during drilling can also degrade bit life. As a result, drill bit components may be formed from one or more materials known to withstand such extreme conditions. For example, bits may be formed from hardened steel, PDC, and tungsten carbide.

Figure 2:
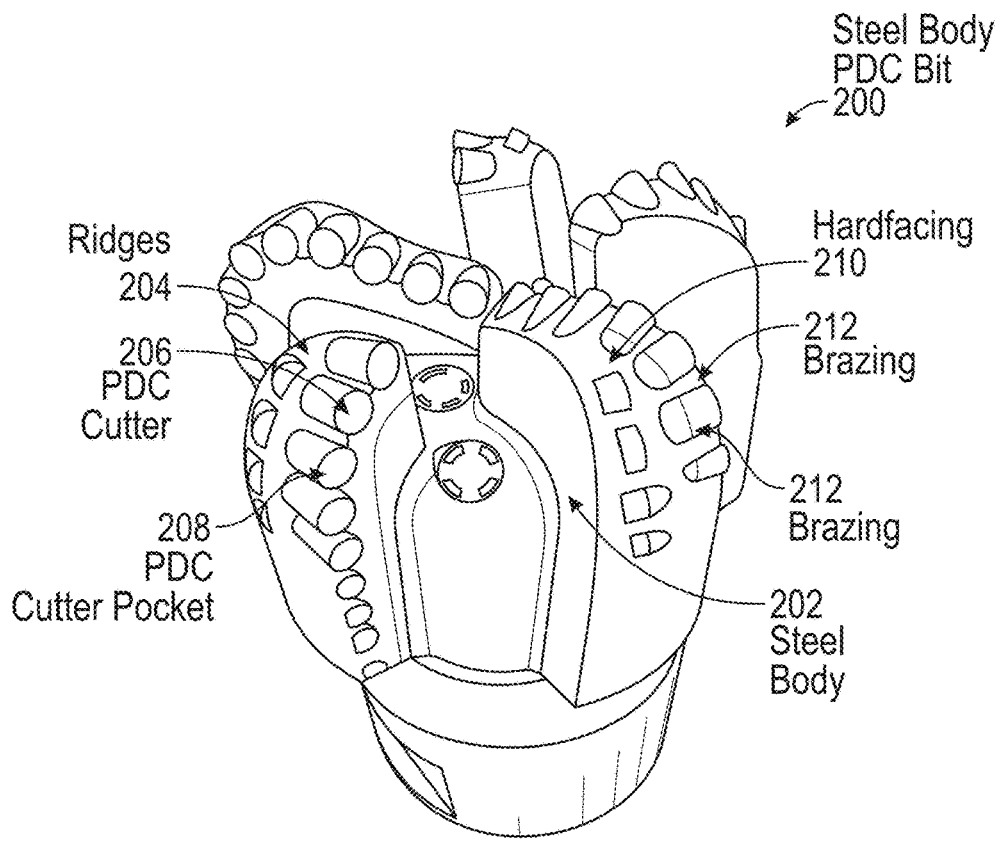
FIG. 2 is a perspective view of a steel body polycrystalline diamond compact (PDC) bit.

In particular, referring to FIG. 2, a steel body PDC bit is shown. The steel body PDC bit 200 has a steel body 202. The steel body PDC bit includes a set of ridges 204 having a set of PDC cutters 206 disposed thereon. The set of PDC cutters 206 are angled to engage formations. The PDC cutters 206 may be mounted on the ridges 204 via cutter pockets 208. A hardfacing material 210 is disposed on the surface of the steel body PDC bit 200 and a brazing material 212 is then applied thereon.

Figure 3:
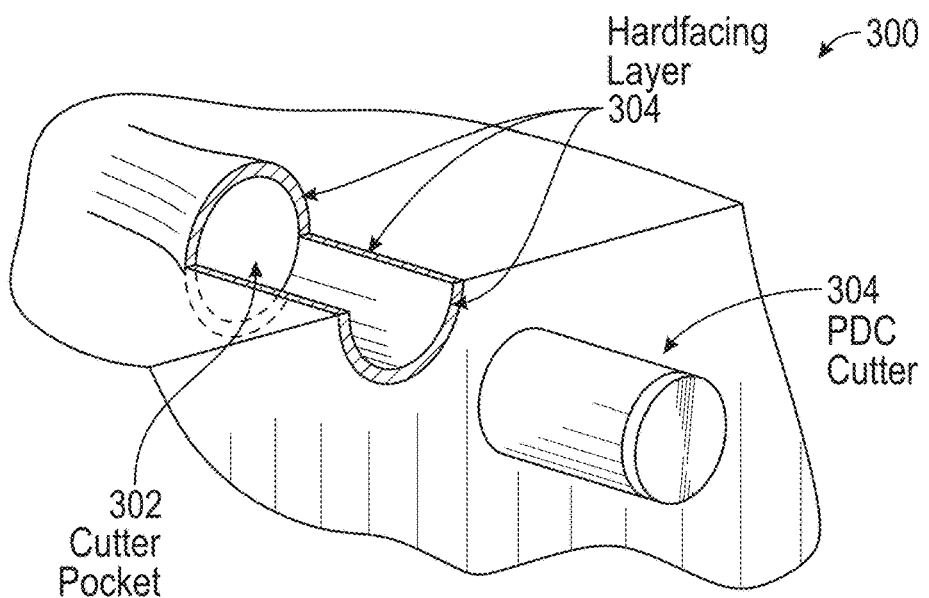
FIG. 3 is a schematic representation of a typical steel body PDC drilling tool showing a cutter pocket and corresponding PDC cutter.

FIG. 3 illustrates a typical configuration for a steel body PDC drilling tool. In particular, referring to FIG. 3, a portion 300 of a steel body PDC drilling tool is shown illustrating a PDC cutter pocket 302. The PDC cutter pocket 302 has a hardfacing layer 304 on its surface. A PDC cutter 304 is also shown outside of the PDC pocket for illustration purposes.

Figure 4:
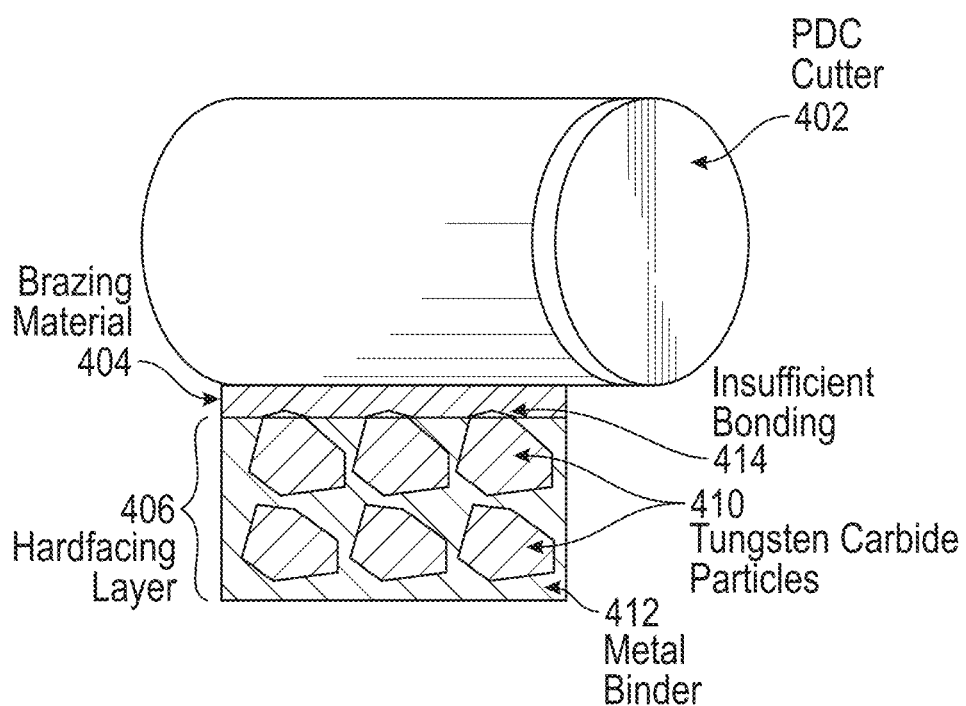
FIG. 4 is a schematic representation of a typical PCD cutter having a hardfacing layer having tungsten carbide particles (uncoated) and a layer of brazing material showing an insufficient bonding between the tungsten carbide particles and the brazing material.

FIG. 4 illustrates the typical layers used in the steel body PDC drilling tool. FIG. 4 shows a PDC cutter 402 having a layer of brazing material 404 and a hardfacing layer 406. The hardfacing layer 406 may include tungsten carbide particles 410 and a metal binder 412.

Figure 5:
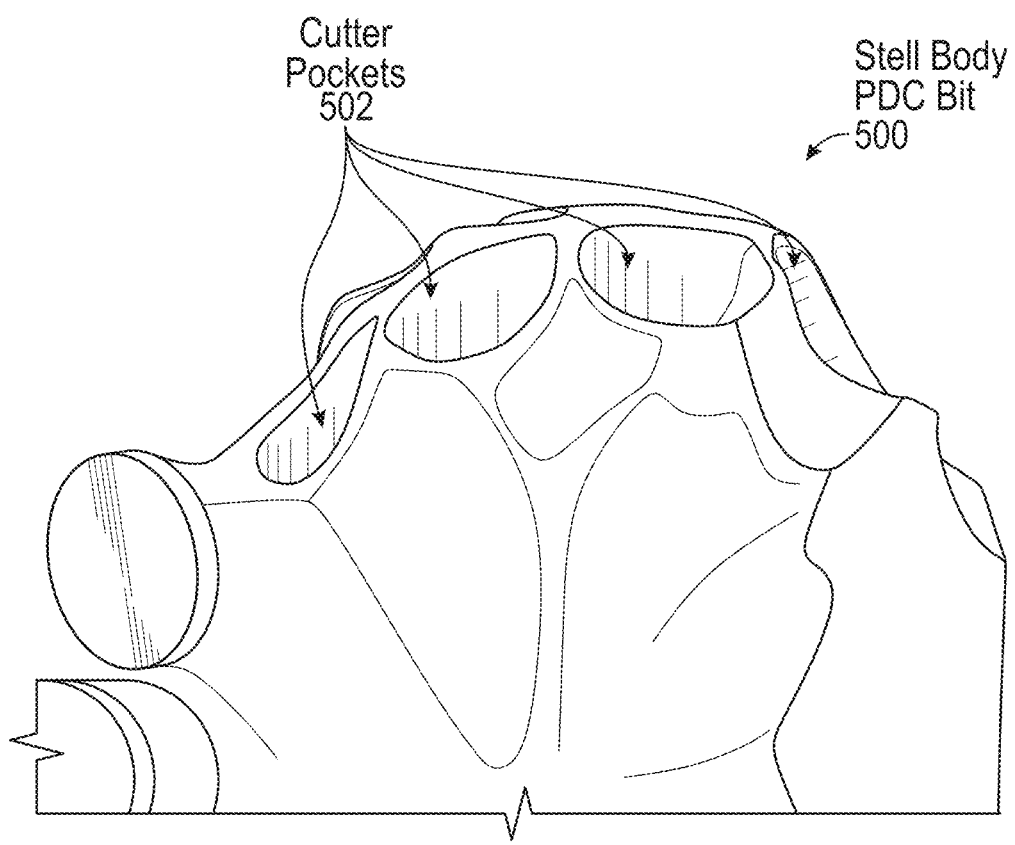
FIG. 5 is a perspective view showing cutter losses in a steel body PDC bit.

It has been found that the layer of brazing material 404 does not provide a sufficient bonding between the hardfacing layer 406 and the PDC cutter 402. Especially between the tungsten carbide particles and the brazing material, there is insufficient bonding 414 to impair the bonding strength of the PDC cutter 402. As a result, and as described above, PDC cutters may fall out of the cutter pockets during drilling. A retrieved steel body PDC bit 500 that lost cutters is illustrated in FIG. 5, which shows the resulting empty PDC cutter pockets 502.

To provide better retention, it has been found that coated tungsten carbide particles within the hardfacing material may improve the bonding between the hardfacing layer and the layer of brazing material.

In some embodiments, a steel body PDC drilling tool may comprise a PDC cutter, a PDC cutter pocket, and a hardfacing layer. The hardfacing layer may comprise coated tungsten carbide particles and a metal binder. In the hardfacing layer, the coated carbide particles may comprise tungsten carbide particles and a coating comprising tungsten metal, titanium metal, a tungsten alloy, a titanium alloy, or mixtures thereof.

Figure 6:
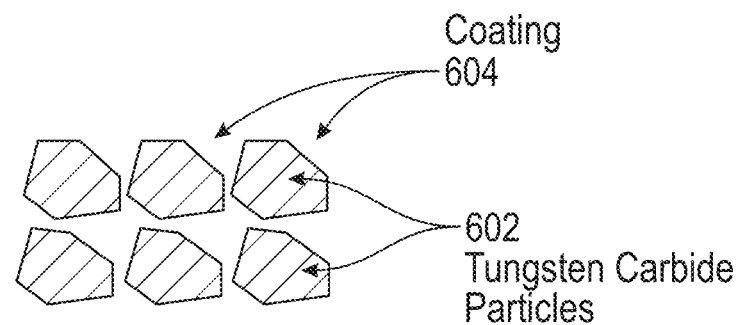
FIG. 6 is a schematic representation of tungsten carbide particles coated prior to the hardfacing process according to one or more embodiments disclosed herein.

FIG. 6 illustrates tungsten carbide particles 602 having a coating 604 according to one or more embodiments disclosed herein. These coated tungsten carbide particles are coated prior to the hardfacing process. These coated tungsten carbide particles may be included in a metal binder.

Figure 7:
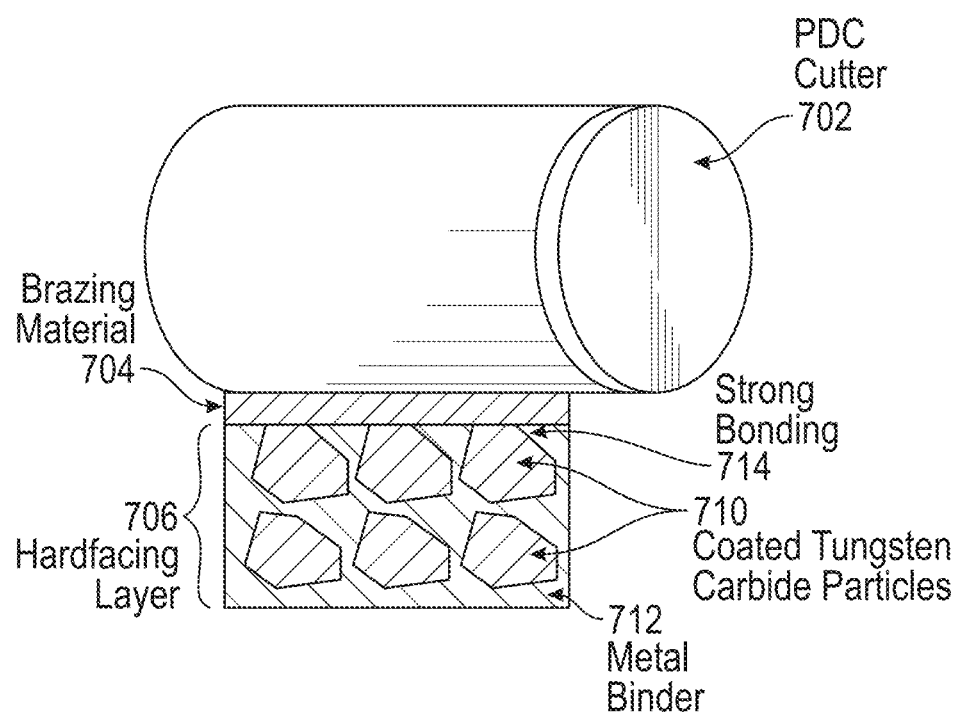
FIG. 7 is a schematic representation of the bonding between coated tungsten carbide particles and the brazing material on a PCD cutter according to one or more embodiments disclosed herein.

FIG. 7 illustrates a strong bonding on a PDC cutter 702 between a brazing material 704 and coated tungsten carbide particles 710 of a hardfacing layer 706, when the hardfacing layer 706 contains coated tungsten carbide particles 710 within a metal binder 712 according to one or more embodiments herein. Once brazing is performed on a steel body PDC drilling tool according to one or more embodiments herein, these coated tungsten carbide particles 710 provide a strong bonding 714 between the brazing material 704 and the hardfacing layer 706 on the PDC cutter 702.

Embodiments herein may also be directed toward methods to improve cutter retention and method for forming a drilling tool. In some embodiments, methods of preventing or reducing cutter loss in a steel body PDC drilling tool may comprise applying a hardfacing layer on a surface of a PDC cutter pocket to form a covered PDC cutter pocket. The hardfacing layer may comprise a metal binder and coated tungsten carbide particles. According to embodiments herein, the coated tungsten carbide particles may comprise tungsten carbide particles and a coating comprising tungsten metal, titanium metal, a tungsten alloy, a titanium alloy, or mixtures thereof. The method of preventing or reducing cutter loss in a steel body PDC drilling tool may comprise bonding a PDC cutter into the covered PDC cutter pocket with a brazing material.

Figure 8:
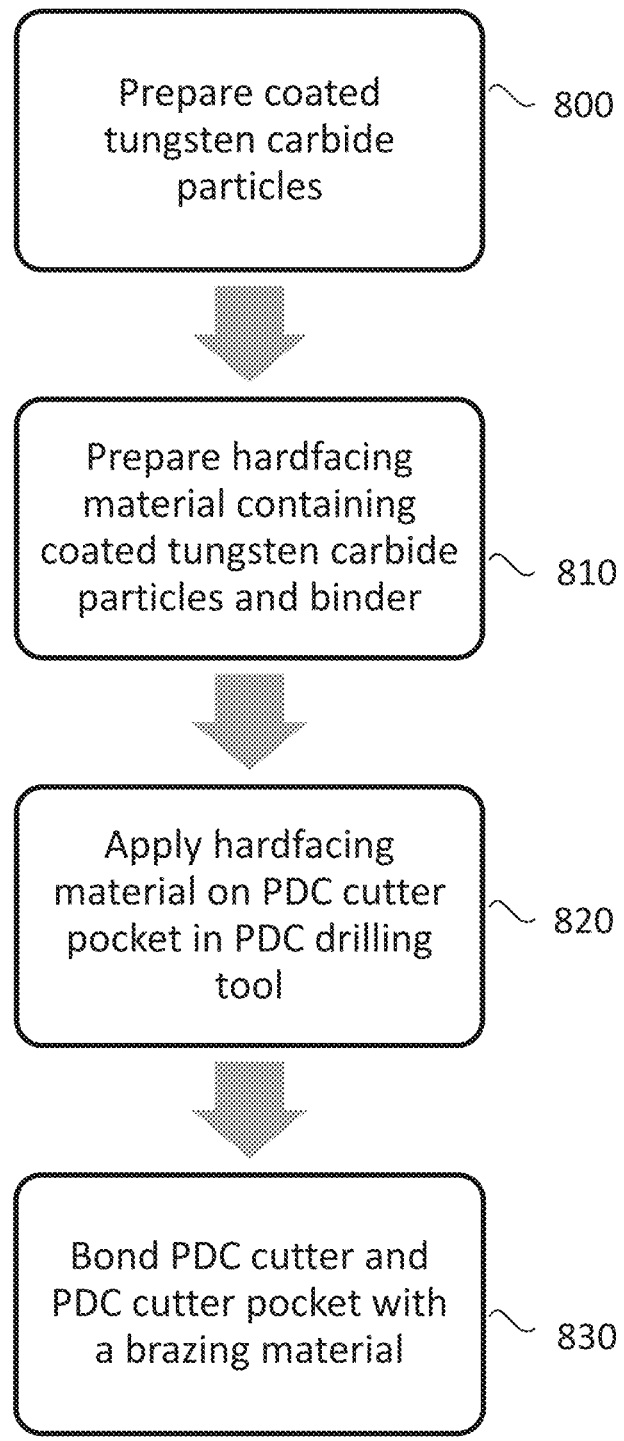
FIG. 8 is a flowchart depicting a method of preventing or reducing cutter loss in a steel body PDC drilling tool where a hardfacing material including coated tungsten carbide particles is used in accordance with one or more embodiments of the present disclosure.

A method of preventing or reducing cutter loss in a steel body PDC drilling tool in accordance with one or more embodiments is depicted by FIG. 8. Specifically, in step 800, coated tungsten carbide particles may be prepared. These coated tungsten particles may be used together with a binder in a hardfacing material in step 810. This hardfacing material may be applied as a hardfacing layer on a PDC cutter pocket in the PDC drilling tool in step 820. In step 830, the hardfacing layer of the PDC cutter pocket may then be bonded to the PDC cutter with a brazing material.

Figure 9:
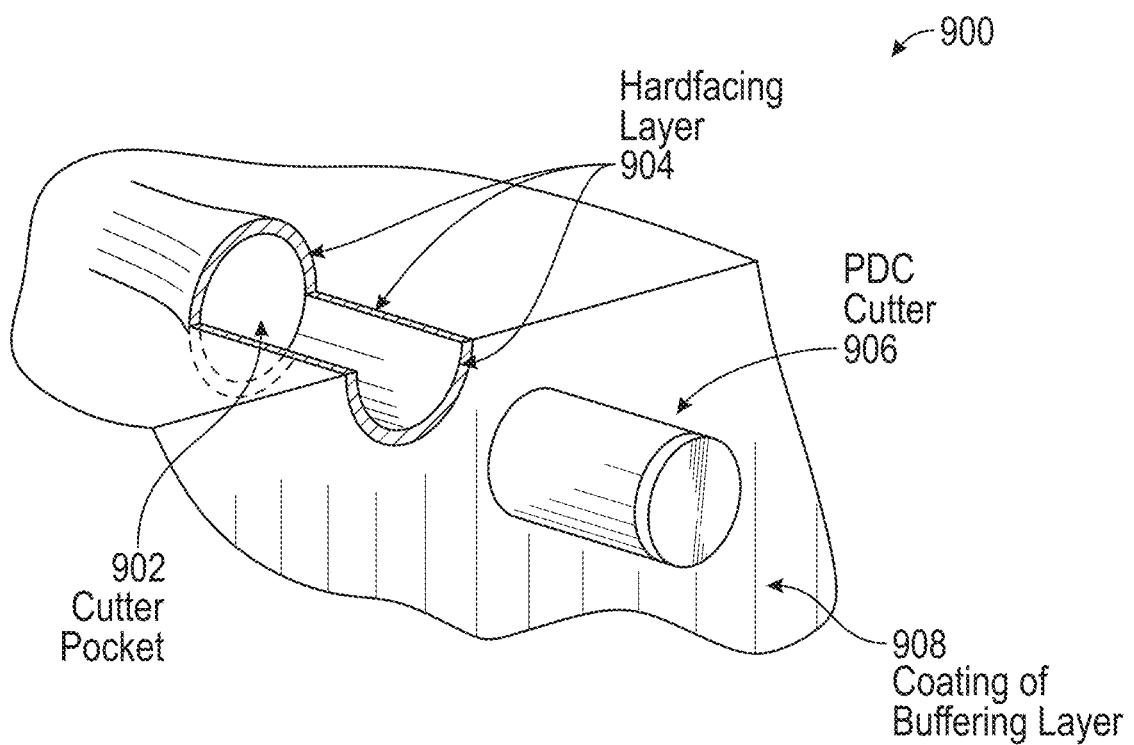
FIG. 9 is a schematic representation of a coated buffering layer applied after the hardfacing process on a cutter pocket and prior to the brazing process according to one or more embodiments disclosed herein.

It has also been found that the use of a coated buffering layer after the hardfacing process may improve cutter retention. For example, FIG. 9 illustrates a portion 900 of a steel body PDC drilling tool showing a PDC cutter pocket 902 having a hardfacing layer 904 on its surface. FIG. 9 also shows separately a PDC cutter 906. FIG. 9 further shows a coated buffering layer 908, which has been applied on the surface of the portion 900 of the steel body PDC drilling tool. More specifically, the coated buffering layer 908 has been applied over the hardfacing layer 904 after the hardfacing process. The PDC cutter 906 may then be bonded to the PDC cutter pocket 902, which has been overlaid with a hardfacing layer 904 and a coated buffering layer 908, with a brazing material.

Figure 10:
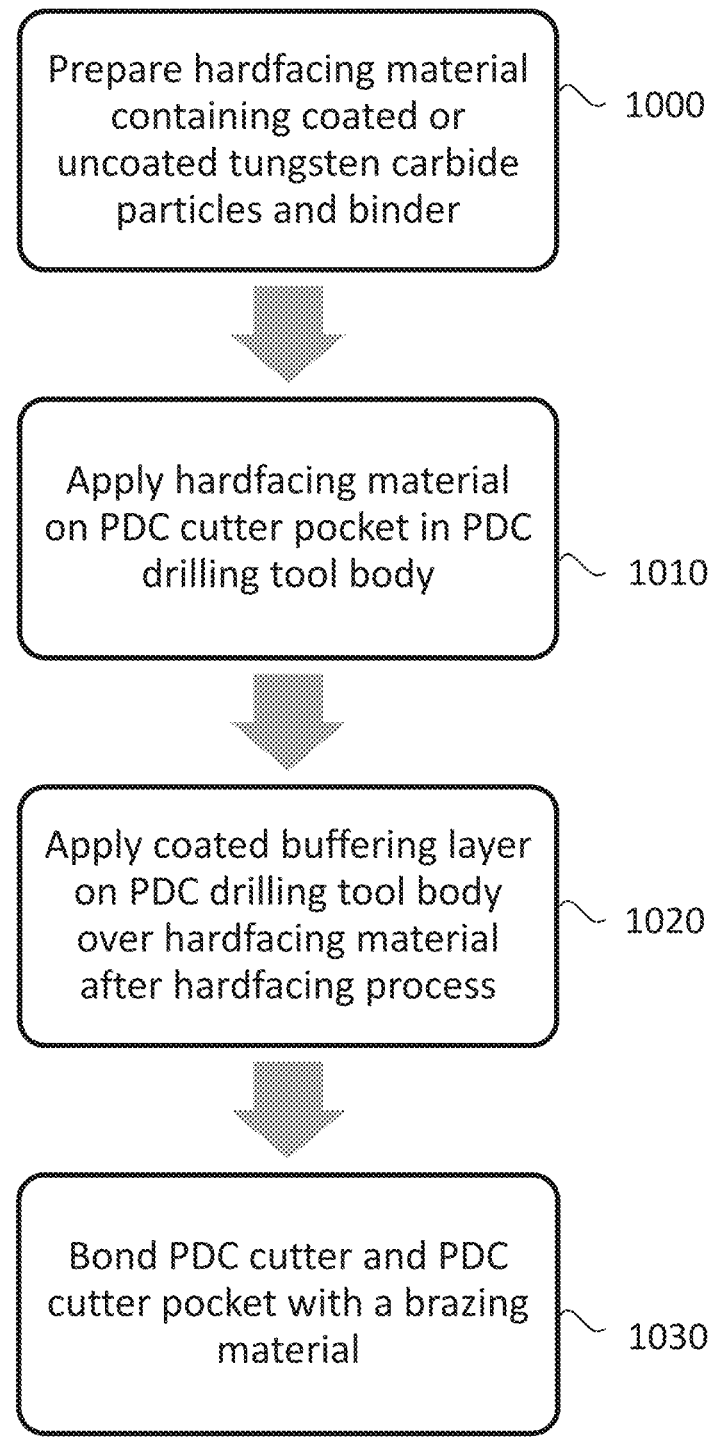
FIG. 10 is a flowchart depicting a method of preventing or reducing cutter loss in a steel body PDC drilling tool where a coated buffering layer is used after the hardfacing process in accordance with one or more embodiments of the present disclosure.

A method of preventing or reducing cutter loss in a steel body PDC drilling tool in accordance with one or more embodiments is depicted by FIG. 10. Specifically, in step 1000, hardfacing material may be prepared. This hardfacing material may be applied on a PDC drilling tool body in step 1010 thus covering the PDC cutter pockets therein with a hardfacing layer. In step 1020, a coated buffering layer may be applied after this hardfacing process on the hardfacing layer on the PDC drilling tool body. In step 1030, the PDC cutter pocket and the PDC cutter may then be bonded with a brazing material.

In some embodiments, methods of preventing cutter loss in a steel body PDC drilling tool may comprise applying a hardfacing layer on a surface of a PDC cutter pocket to form a covered PDC cutter pocket. The hardfacing layer may comprise a metal binder and coated tungsten carbide particles. The coated tungsten carbide particles may comprise tungsten carbide particles and a coating comprising tungsten metal, titanium metal, a tungsten alloy, a titanium alloy, or mixtures thereof. The methods of preventing cutter loss in a steel body PDC drilling tool may comprise bonding a PDC cutter to the covered PDC cutter pocket with a brazing material In other embodiments, methods of preventing cutter loss in a steel body polycrystalline diamond compact (PDC) drilling tool, the method comprising applying a hardfacing layer on a surface of a PDC cutter pocket of the steel body PDC drilling tool; applying a coated buffering layer on the hardfacing layer to form a coated PDC cutter pocket; and bonding the PDC cutter into the coated PDC cutter pocket with a brazing material, wherein the coated buffering layer comprises tungsten metal, titanium metal, nickel metal, cobalt metal, chromium metal, iron metal, a tungsten alloy, a titanium alloy, a nickel alloy, a cobalt alloy, a chromium alloy, an iron alloy, or mixtures thereof.

As described above, embodiments herein provide for steel body PDC drilling tools having improved performance due to greater bonding strength between the drilling tool body and the PDC cutter. In some embodiments, the steel body PDC drilling tools may include a PDC bit, a reamer, a hole opener, a milling tool, or a stabilizer. In particular, a PDC drilling tool may include a steel bit body having one or more cutter pockets therein. The drilling tool may include one or more intermediate coating layers, including a hardfacing layer, wherein the hardfacing layer may be coated onto the steel drilling tool body and may include coated tungsten carbide particles dispersed within a metal binder. In other embodiments, intermediate coating layers may include a hardfacing layer and a coated buffering layer overlaid onto the hardfacing layer after the hardfacing process. In these embodiments, a brazing material may be applied to bond the PDC cutters and PDC cutter pockets. Each of these layers and materials is described in more detail below.

Tungsten Carbide Particles

In some embodiments, tungsten carbide particles used in the hardfacing layer may include tungsten carbide (WC), tungsten carbide (WC) alloys, other tungsten carbide phases, and/or mixtures thereof. Some embodiments of the invention may include one or more of the following types of tungsten carbide particles: sintered carbide, in the form of crushed or spherical particles; crushed cast carbide; spherical cast carbide; macroline carbide; and macro-crystalline tungsten carbide. More particularly, tungsten carbide particles may include sintered tungsten carbide cobalt (WC—Co) alloys, sintered tungsten carbide nickel (WC—Ni) alloys, sintered tungsten carbide cobalt nickel (WC—Co—Ni) alloys, cast tungsten carbide WC/$W_2C$, macroline tungsten carbide (WC/$W_2C$), monocrystalline tungsten carbide (WC), and/or mixtures thereof.

In some embodiments, the range of sizes of the tungsten carbide particles may be from about 25 microns (μm) to about 2.0 millimeters (mm), from 30 μm to about 1.5 mm, 35 μm to about 1.0 mm, 40 μm to about 0.5 mm, or 50 μm to about 0.1 mm. The range of sizes of the tungsten carbide particles in a metal binder may be defined by the largest and smallest sizes of these particles. An exemplary binder comprising tungsten carbide particles in the range of from 25 μm to 50 μm will mainly contain particles larger than 25 μm and smaller than 50 μm with at least 95 weight percentage, whereas another binder comprising particles in the range of from 1.0 mm to 2.0 mm mesh will mainly contain particles larger than 1.0 mm and smaller than 2.0 mm with at least 95 weight percentage. In some embodiments, large tungsten carbide particles may be mixed with small tungsten carbide particles in the metal binder to provide better abrasion and erosion resistance.

In one embodiment, the tungsten carbide particles are coated prior to being placed in a hardfacing material containing a binder. In this embodiment, tungsten and titanium may be used as the coating. The coating of tungsten and titanium may be performed using various processes including chemical vapour deposition (CVD), physical vapour deposition (PVD), electrodeposition, electroless plating, atomic layer deposition (ALD), spray-and-fuse, and thermal spray. Other coating processes are known in the art, and the above descriptions are not intended to limit the scope of the present invention. In particular, other coating techniques may be used. Those of ordinary skill in the art, having reference to this disclosure, will recognize that a number of other methods may be used to deposit the coating on the tungsten carbide particles in accordance with the present invention.

The tungsten and titanium may be deposited so as to have a thickness from about 5 nm to about 100 μm, from about 10 nm to about 50 nm, from about 100 nm to about 1 μm, from about 1 μm to about 100 μm, from about 5 μm to about 80 μm, from about 10 μm to about 50 μm or from about 20 μm to about 30 μm.

Hardfacing Layer

The hardfacing layer may be formed by a fusion welding process in which tungsten carbide particles are added to the molten weld pool. Fusion welding processes suitable for use with the invention may include OAW (oxyacetylene welding), GMAW (gas metal arc welding), FCAW (flux cored arc welding), PAW (plasma arc welding), LW (laser welding), GTAW (gas tungsten arc welding), SAW (submerged arc welding), EBW (electron beam welding), thermal spraying, spray and fuse, or pre-processing by additive manufacturing or other manufacturing process, etc. In an embodiment, the metal binder for the welding process is a nickel-based alloy comprising chromium and boron, and tungsten carbide particles are added to the molten weld pool. In some embodiments, for example, the hardfacing materials may be applied around and on the surface of a PDC cutter pockets in a steel body PDC drilling tool using a OAW process. The welding process may be, for example, semi-automatic or robotic, which would allow for programming of the movement of the welding gun. During the fusion welding process, the composition of the metal binder may be modified by dilution from the base metal and/or reaction between the metal binder and the wear resistant particles. For example, when the base metal is ferrous but has a lower alloy content than the metal binder, the metal binder may be "diluted" by the base metal. When the molten metal binder partially dissolves the wear resistant particles, elements from the wear resistant particles may be incorporated into the metal binder. Reaction between the metal binder and the tungsten carbide particles may also lead to formation of reaction products in the vicinity of the tungsten carbide particles.

Brazing Material

Cutters may be attached to a steel body PDC drilling tool by a brazing process. In the brazing process, a brazing material is positioned between the PDC cutter and the PDC cutter pocket. The material is melted and, upon subsequent solidification, bonds the PDC cutter in the PDC cutter pocket. Selection of brazing materials depends on their respective melting temperatures. Metal alloys typically used as brazing materials may include, for example, silver, copper, nickel, or gold based alloys. More specifically, base metals may be selected from silver, copper, nickel, and gold, while alloys may also include as other constituents at least one of tin, zinc, titanium, zirconium, nickel, manganese, tellurium, selenium, antimony, bismuth, gallium, cadmium, iron, silicon, phosphorous, sulfur, platinum, palladium, lead, magnesium, germanium, carbon, oxygen, as well as other elements. Generally, gold-, nickel-, and copper-based alloys may be used as high temperature brazing materials, whereas silver-based alloys typically may have brazing temperatures of less than about 700° C.

Coated Buffering Layer

In one or more embodiments, the hardfacing layer containing tungsten carbide particles (uncoated or coated) and a metal binder may be applied on the steel body PDC drilling tool over and around the PDC cutter pockets. After this hardfacing process, the hardfacing layer on the steel body PDC drilling tool may then be coated to form coated PDC cutter pockets in the steel body PDC drilling tool. The hardfacing layer may be coated with a coated buffering layer forming coated PDC cutter pockets prior to the bonding of the PDC cutters into the coated PDC cutter pockets with a brazing material. In this embodiment, tungsten metal, titanium metal, nickel metal, cobalt metal, chromium metal, iron metal, a tungsten alloy, a titanium alloy, a nickel alloy, a cobalt alloy, a chromium alloy, an iron alloy, or mixtures thereof may be used in the coated buffering layer. The coating of tungsten metal, titanium metal, nickel metal, cobalt metal, chromium metal, iron metal, a tungsten alloy, a titanium alloy, a nickel alloy, a cobalt alloy, a chromium alloy, an iron alloy, or mixtures thereof may be performed using various processes including chemical vapour deposition (CVD), physical vapour deposition (PVD), electrodeposition, electroless plating, atomic layer deposition (ALD), spray-and-fuse, and thermal spray. Other coating processes are known in the art, and the above descriptions are not intended to limit the scope of the present invention. In particular, other coating techniques may be used. Those of ordinary skill in the art, having reference to this disclosure, will recognize that a number of other methods may be used to deposit the coating on the tungsten carbide particles in accordance with the present invention.

The tungsten metal, titanium metal, nickel metal, cobalt metal, chromium metal, iron metal, a tungsten alloy, a titanium alloy, a nickel alloy, a cobalt alloy, a chromium alloy, an iron alloy, or mixtures thereof may be deposited on the hardfacing layer so as to have a thickness from about 5 nm to about 100 μm, from about 10 nm to about 50 nm, from about 100 nm to about 1 μm, from about 1 μm to about 100 μm, from about 5 μm to about 80 μm, from about 10 μm to about 50 μm or from about 20 μm to about 30 μm.

The above mentioned applications of coating on the carbide particles before the hardfacing process and the coated buffering layer after the hardfacing process is not limited to the steel body PDC bits. Instead, they can be implemented to all downhole drilling tools which have a steel body, a hardfacing, a hardfacing containing carbide, a brazing process and a cutter. The examples of these implementations can be steel body PDC bits, reamers, hole openers, milling tools or stabilizers.

It has been found that a steel body PDC drilling tool having coated tungsten carbide particles included in a hardfacing layer bonding with a layer of brazing material between a PDC cutter and a PDC cutter pocket provides better retention of the cutter during drilling conditions. The coated tungsten carbide particles may include tungsten carbide particles and a coating comprising tungsten metal, titanium metal, a tungsten alloy, a titanium alloy, or mixtures thereof In addition, it has been found that preventing cutter loss in a steel body PDC drilling tool may be achieved by applying, after the hardfacing process, a coated buffering layer on the hardfacing layer on the surface of a PDC cutter pocket and bonding with a brazing material the PDC cutter into the coated PDC cutter pocket. The coated buffering layer may include tungsten metal, titanium metal, nickel metal, cobalt metal, chromium metal, iron metal, a tungsten alloy, a titanium alloy, a nickel alloy, a cobalt alloy, a chromium alloy, an iron alloy, or mixtures thereof.

While only a limited number of embodiments have been described, those skilled in the art, having benefit of this disclosure, will appreciate that other embodiments can be devised which do not depart from the scope of the disclosure.

Although the preceding description has been described here with reference to particular means, materials and embodiments, it is not intended to be limited to the particulars disclosed here; rather, it extends to all functionally equivalent structures, methods and uses, such as those within the scope of the appended claims.

The presently disclosed methods and apparatus may suitably comprise, consist or consist essentially of the elements disclosed and may be practiced in the absence of an element not disclosed. For example, those skilled in the art can recognize that certain steps can be combined into a single step.

Unless defined otherwise, all technical and scientific terms used have the same meaning as commonly understood by one of ordinary skill in the art to which these systems, apparatuses, methods, processes and compositions belong.

The ranges of this disclosure may be expressed in the disclosure as from about one particular value, to about another particular value, or both. When such a range is expressed, it is to be understood that another embodiment is from the one particular value, to the other particular value, or both, along with all combinations within this range.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

The invention claimed is:

1. A method of preventing or reducing cutter loss in a steel body polycrystalline diamond compact (PDC) drilling tool, the method comprising:
    applying a hardfacing layer on a surface of a PDC cutter pocket to form a covered PDC cutter pocket, the hardfacing layer comprising a metal binder and coated tungsten carbide particles; and
    bonding a PDC cutter into the covered PDC cutter pocket with a brazing material,
    wherein the coated tungsten carbide particles comprise tungsten carbide particles and a coating comprising tungsten metal, titanium metal, a tungsten alloy, a titanium alloy, or mixtures thereof,
    wherein the coating has a thickness of 10 to 50 nm.

2. The method of claim 1, wherein the tungsten carbide particles comprise tungsten carbide (WC), tungsten carbide (WC) alloys, and/or mixtures thereof.

3. The method of claim 1, wherein the tungsten carbide particles comprise sintered tungsten carbide cobalt (WC—Co) alloys, sintered tungsten carbide nickel (WC—Ni) alloys, sintered tungsten carbide cobalt nickel (WC—Co—Ni) alloys, cast tungsten carbide WC/W2C, macroline tungsten carbide (WC/W2C), monocrystalline tungsten carbide (WC), and/or mixtures thereof.

4. The method of claim 1, wherein the tungsten carbide particles have particle sizes in a range from about 25 microns (µm) to about 2 millimeters (mm).

5. The method of claim 1, wherein the brazing material comprises a silver alloy.

6. The method of claim 1, wherein the drilling tool comprises a polycrystalline diamond compact (PDC) bit, a reamer, a hole opener, a milling tool, or a stabilizer.

7. A steel body polycrystalline diamond compact (PDC) drilling tool comprising a steel body, a PDC cutter, a PDC cutter pocket, and a hardfacing layer, wherein the hardfacing layer comprises coated tungsten carbide particles and a metal binder, wherein the coated carbide particles comprise tungsten carbide particles and a coating comprising tungsten metal, titanium metal, a tungsten alloy, a titanium alloy, or mixtures thereof, wherein the coating has a thickness of 10-50 nm.

8. The steel body PDC drilling tool of claim 7, wherein the PDC cutter further comprises a layer comprising a brazing material.

9. The steel body PDC drilling tool of claim 7, wherein the tungsten carbide particles comprise tungsten carbide (WC), tungsten carbide (WC) alloys, and/or mixtures thereof.

10. The steel body PDC drilling tool of claim 7, wherein the tungsten carbide particles comprise sintered tungsten carbide cobalt (WC—Co) alloys, sintered tungsten carbide nickel (WC—Ni) alloys, sintered tungsten carbide cobalt nickel (WC—Co—Ni) alloys, cast tungsten carbide WC/W2C, macroline tungsten carbide (WC/W2C), monocrystalline tungsten carbide (WC), and/or mixtures thereof.

11. The steel body PDC drilling tool of claim 7, wherein the tungsten carbide particles have particle sizes in a range from about 25 microns (µm) to about 2 millimeters (mm).

12. The steel body PDC drilling tool of claim 7, wherein the brazing material comprises a silver alloy.

13. The steel body PDC drilling tool of claim 7, wherein the drilling tool comprises a polycrystalline diamond compact (PDC) bit, a reamer, a hole opener, a milling tool, or a stabilizer.

* * * * *